United States Patent [19]
Douglas

[11] 3,742,590
[45] July 3, 1973

[54] METHOD FOR MAKING IMPROVED LINED CONDUIT JOINTS

[75] Inventor: Burke Douglas, Midland, Mich.

[73] Assignee: The Dow Chemical Company, Midland, Mich.

[22] Filed: Sept. 25, 1970

[21] Appl. No.: 75,427

[52] U.S. Cl. .................................. 29/523, 285/55
[51] Int. Cl. ..................... B21d 39/00, B23p 11/02
[58] Field of Search ............... 29/523, 157; 285/55, 285/174

[56] References Cited
UNITED STATES PATENTS

| | | | |
|---|---|---|---|
| 1,875,885 | 9/1932 | Quarnstrom | 285/55 X |
| 2,065,480 | 12/1936 | Soper | 285/55 X |
| 2,919,936 | 1/1960 | Hurley | 285/55 |
| 3,239,931 | 3/1966 | Guarnaschelli | 285/55 X |
| 3,399,908 | 9/1968 | Kurtz | 285/55 |

FOREIGN PATENTS OR APPLICATIONS 1,383,155   11/1964   France ............................... 285/55

*Primary Examiner*—Charlie T. Moon
*Attorney*—Griswold & Burdick, Richard G. Waterman and Robert B. Ingraham

[57] ABSTRACT

Joints are prepared in ductile metal conduits having thermoplastic lining by affixing the lining to the terminal portion of the conduit and deforming the conduit and lining simultaneously to form an outwardly extending flange adapted to mate with a like flange wherein the lining material may contact a like lining material of similar conduit end.

4 Claims, 5 Drawing Figures

PATENTED JUL 3 1973 3,742,590
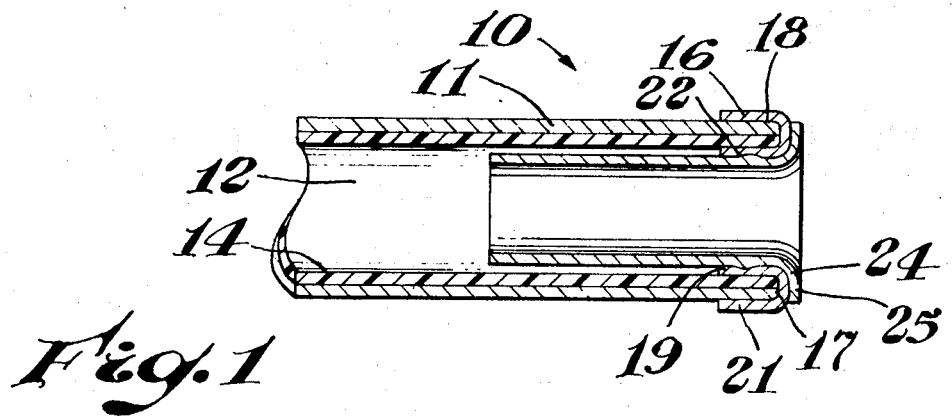
Fig. 1
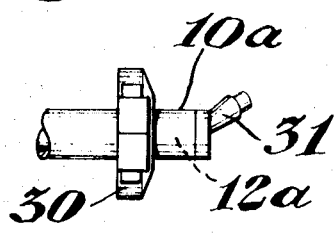
Fig. 2
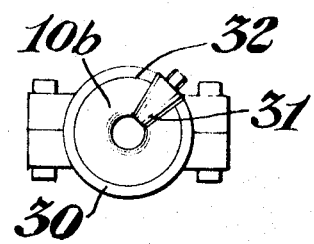
Fig. 3
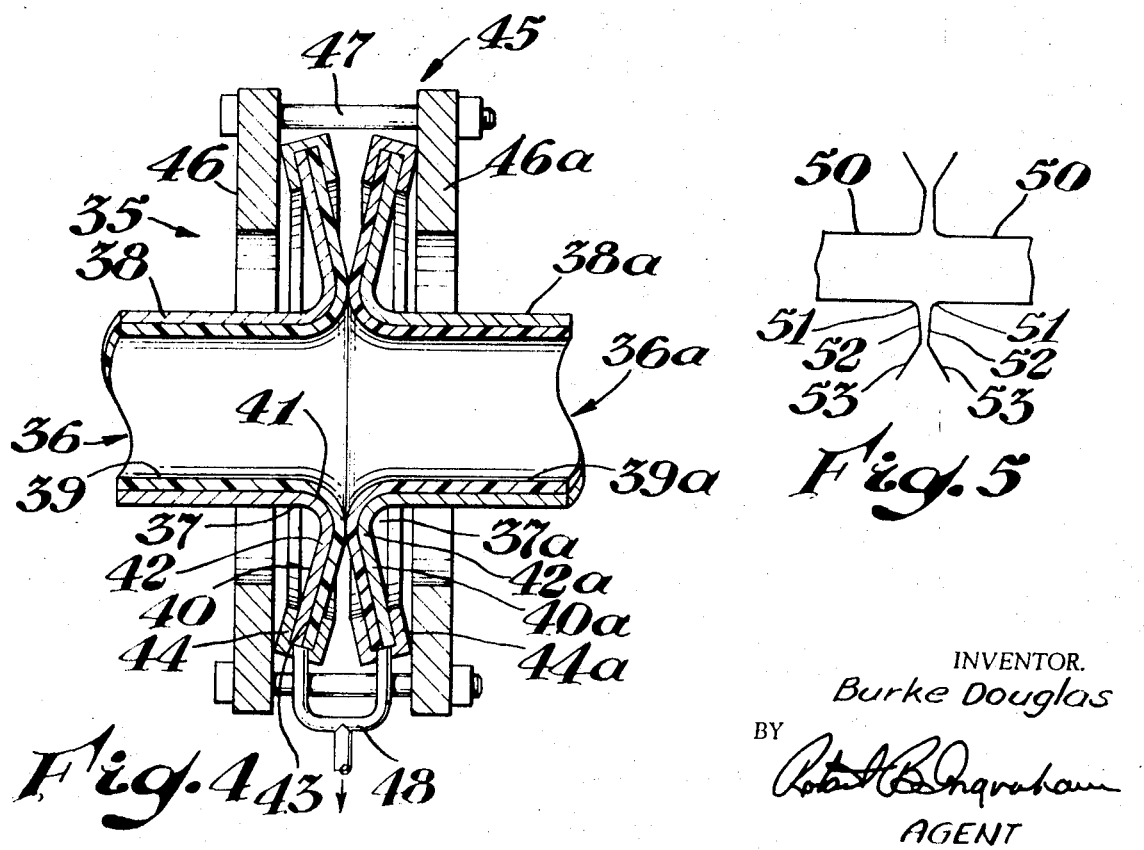
Fig. 4
Fig. 5
INVENTOR.
Burke Douglas
BY
AGENT

METHOD FOR MAKING IMPROVED LINED CONDUIT JOINTS

The problem of corrosion in conduits has been a substantial problem for many years. A wide variety of solutions have been set forth to solve the corrosion problems in a variety of ways. From an economic standpoint, steel pipe or conduit is employed whenever possible. However, for applications requiring corrosion resistance substantially greater than that offered by steel, materials such as aluminum, copper, brass, stainless steel, glass, titanium, lead and like conduits have been employed. However, from an economic standpoint as well as a functional standpoint, it has been found frequently advantageous to employ conduits lined with non-metallic materials such as plastics, rubber, glass, phenolic resins and the like. Particularly beneficial lining materials for many applications are thermoplastic synthetic resins which offer a chemical resistance to many materials together with ease of forming. Thermoplastic linings may be readily formed by processes such as extrusion at low cost and incorporated within a rigid outer conduit such as steel or the like. Connecting lengths of thermoplastic lined conduits has presented problems over a substantial period of time. In selecting a lined conduit for an application, it is very desirable that the conduit lengths be made up at or near the job site. A number of methods have been provided which permit this to be accomplished with standard lined pipe; that is, pipe such as Schedule 40 which has a wall thickness sufficient to permit threading and application of a screwed flange. However, when thin wall conduit or tubing is plastic lined, such as Schedules 5, 10 and 20, wall thickness generally is too light to employ conventional threaded flanges and permit field molding of a flange on the liner. A variety of joints have been proposed for such thin wall lined conduit applications wherein external standard pipe threads cannot be practically formed in the metallic conduit. Various flared and butt joints have been utilized with assorted gasketing and sealing arrangements. However, none have been found entirely satisfactory for providing a joint withstanding the rigors of temperature cycling and the inherent liner cold flow (deformation under pressure of the plastic lining material).

It would be desirable if there were an improved joint for plastic lined conduit which did not require formation of external threads on a conduit.

It would also be advantageous if there were an improved method for the formation of ends of such lined conduit.

It would further be desirable if such ends compensated for at least a portion of the cold flow occurring within the lining material.

These benefits and other advantages in accordance with the present invention are achieved in a method for forming ends on a thermoplastic lined metallic conduit, the steps of the method comprising providing a ductile metal conduit having a thermoplastic resinous liner, the conduit having an end, affixing the lining to the conduit adjacent to the end, simultaneously deforming the conduit and liner to form a generally radially outwardly extending flange, and beneficially at least a portion of the flange has a generally frustoconical configuration and encircles a portion of the conduit.

Also contemplated within the scope of the invention is an improved conduit end as prepared by the hereinbefore described method.

Further features and advantages of the present invention will become more apparent from the following specification taken in connection with the drawing wherein:

FIG. 1 depicts a conduit end ready to be flanged in accordance with the present invention.

FIG. 2 schematically depicts a conduit end about to be flanged in accordance with the present invention.

FIG. 3 depicts the completion of flanging a conduit end in accordance with the invention.

FIG. 4 depicts a joint between two conduit ends in accordance with the invention.

FIG. 5 schematically depicts alternate conduit ends in accordance with the invention.

In FIG. 1 there is schematically depicted a conduit end generally designated by the reference numeral 10. The conduit end 10 comprises an outer ductile metallic casing or conduit 11 defining an internal, generally cylindrical passageway 12. Within the passageway 12 and coextensive with the internal surface of the conduit 11 is a synthetic resinous thermoplastic liner 14. The liner 14 and the conduit 11 are generally coextensive in length. A retainer 16 of a ductile metal is disposed over a terminal portion 17 of the conduit end 10. The retainer 16 has a generally annular configuration and a U-shaped cross-section wherein a generally axially extending annular recess 18 is defined by an inner retainer leg 19 and an outer retainer leg 21. The inner leg 19 has been deformed in a region 22 by crimping to firmly engage the liner portion 14 and maintain it in fixed relationship to the conduit 11. The retainer 16 is of a ductile metal such aluminum, brass, steel or the like. A sleeve 24 optionally is disposed within the passageway 12 within the annular retainer 16. The sleeve 24 beneficially has a terminal flange or stop means 25 which permits the flange 24 to be disposed within the conduit end 10 for a predetermined distance. Beneficially, the sleeve 24 is of a relatively low strength ductile metal such as lead, copper, lead-tin alloys and the like. Optionally, the sleeve 24 is employed in the method of the invention when the plastic lining 14 may be reasonably subject to damage when the conduit end is deformed to provide the flange. The sleeve 24 can provide heat to the plastic lining during the deformation and is readily removeable, usually with no more equipment than a pair of pliers. Alternately, the deformed sleeve may be retained as a sealing gasket.

In FIG. 2 there is schematically depicted initiation of deformation of a conduit end such as a conduit end 10a held within a split die or chuck 30. A forming tool 31 having a generally frustoconical configuration is disposed at least partially within the passageway 12a of the conduit end 10a. The tool 31 and conduit 10a are rotated relative to each other with the tool 31 being forced in a generally arcuate path having a center lying within the conduit end 10a to force material of the end 10a to conform to the face 32 of the die 30.

In FIG. 3 there is schematically depicted the completion of the forming of a flange on the conduit end 10a designated by the reference numeral 10b wherein the forming tool 31 has conformed the conduit end 10a to the face 32 of the die 30 forming the flange 10b. Suitable tube rolling and flanging apparatus is readily available from a number of commercial sources and is well known to those familiar with the art of tube forming.

FIG. 4 depicts a sectional view of a joint in accordance with the present invention generally designated by the reference numeral 35. The joint 35 comprises a first conduit 36 having a conduit end 37. The conduit 36 comprises an outer casing portion 38 and a synthetic resinous thermoplastic liner 39. The conduit end 37 has a generally radially outwardly extending flange 40 consisting of material of the ductile metal conduit and the thermoplastic lining material. The flange 40 consists of a belled or smoothly, outwardly flaring section 41 adjacent to the cylindrical conduit body 38 and forming a transition zone between a generally planar radially outwardly directed portion 42. The end 38 terminates in a generally frustoconical portion 43 integral with the portion 42 which encircles and is generally coaxial with a portion of the conduit 38. As depicted in FIG. 4, the frustoconical section overlies or encircles the belled portion 41. Thus, in effect, the end 38 represents a reverse bend of the conduit; that is, the conduit has been deformed to such an extent that the angle external to the conduit between a line tangent to the plastic portion of the face 43 and the longitudinal axis of the conduit is greater than 90°. Affixed to the frustoconical portion 43 is a retainer 44. A second conduit end 36a is in generally coaxial abutting relationship with the conduit 36 through the conduit end 37a. Portions of the conduit 36a which correspond to portions of the conduit 36 are designated by reference numerals having the suffix "a". The conduit ends 36 and 36a are held together by means of a retaining assembly generally designated by the reference numeral 45. The retaining assembly comprises a first annular flange 46 and a second annular flange 46a. The annular flange 46 is disposed about the conduit 36 and the flange 46a about the conduit 36a. A plurality of bolts 47 passing through appropriate holes in the flanges, not shown, provide a means to draw the flanges 46 and 46a together and exert a desired pressure about the periphery of the frustoconical portions 40 and 40a of the conduits 36 and 36a, through the retaining means 44 and 44a.

Thus, in the regions 42 and 42a, the plastic lining material is forced into mating and sealing contact. Due to the reverse bend in the flanges, the terminal portions of the flange act generally as cone spring washers and maintain the sealing force even with minor cold flow of the lining material in the regions 42 and 42a. The retaining means 44 and 44a optionally may be removed after formation of the flange, or, if diffusion of material on the inside of the conduit through the liner is expected in service, desirably the retainers are left in place and a vent connection 48 provided, such as is depicted in FIG. 4 wherein a T tube provides venting for any vapors passing between the inner wall of the conduit 38 and the outer surface of the plastic liner 39.

The present invention may be employed with a wide variety of lined conduits such as steel, aluminum, brass and other ductile metals lined with materials such as:
polytetrafluoroethylene
FEP (fluorinated ethylene-propylene copolymer)
polyvinylidenefluoride
polychlorotrifluoroethylene
polybutyl acrylate
polyvinyl acetate
ethyl cellulose
polyformaldehyde
polyvinyl fluoride
polyisobutyl methacrylate
polybutyl methacrylate
polymethyl acrylate
polypropyl methacrylate
polyethyl methacrylate
polymethyl methacrylate
cellulose acetate
cellulose propionate
cellulose acetate butyrate
cellulose nitrate
polyvinyl butyral
polypropylene
low density polyethylene (branched)
polyisobutylene
natural rubber
perbunan
polybutadiene
nylon (condensation copolymer of hexamethylenediamine and adipic acid)
polyvinyl chloroacetate
polyvinylchloride
polyethylene (high density linear)
a copolymer of 67 parts by weight methyl methacrylate and 33 parts by weight styrene
a copolymer of 85 parts by weight vinyl chloride and 15 parts by weight vinylidene chloride
poly-alpha-methylstyrene
a copolymer of 60 parts by weight styrene and 40 parts by weight butadiene
neoprene
a copolymer of 70 parts by weight styrene and 30 parts by weight acrylonitrile
polystyrene
a rubber modified polystyrene copolymer of 85 parts by weight vinylidene chloride and 15 parts by weight vinyl chloride
polydichlorostyrene
polycarbonate resins such as 2,2-bis(chloromethyl)oxacyclobutane Forming of the plastic-metal composite must be done at a temperature above the glass transition temperature of the particular material employed for the liner.

In FIG. 5 there is schematically depicted a pair of mating conduit ends in accordance with the present invention. The conduit ends are of identical configuration and are designated by the reference numeral 50. The conduit ends 50 each have a belled or radially outwardly flaring portion 51, a first generally frustoconical portion 52 external to the belled portion 51. The first frustoconical portion 52 extends radially outwardly and encircles space external to the conduit; that is, the flanged portion has been deformed less than 90° from the longitudinal axis of the conduit. A second generally frustoconical section 53 is disposed peripheral to and integral with the first frustoconical section 52 and generally encircles the terminal portion of the conduit including the first frustoconical section 52. The second frustoconical section 53 is formed by displacing the conduit by an amount greater than 90°.

The configuration of FIG. 5 is particularly suitable wherein the joint may be subject to conditions wherein temperatures may rise beyond the normal service temperatures for the plastic liner and a greater than normal amount of cold flow in the liner may occur. Thus, at least a substantial portion of the flow of the liner occurs over a relatively large radial distance and the deformation results in inward flow of the liner material while maintaining sealing engagement.

By way of further illustration, a 2 inch nominal diameter Schedule 10 aluminum tube is employed having a lining of polytetrafluoroethylene 0.093 inch thick. An annular ring of dead soft aluminum having a thickness of about 0.70 inch and having the configuration of the ring 16 of FIG. 1 is crimped on one end of the pipe by rotating the pipe and crimping the ring by means of a ½ inch diameter ball pressed against the inner surface as the ring is rotated. The exterior portion of the ring is similarly crimped. The pipe is subsequently flared employing a rotating frustoconical tool substantially in the manner of FIGS. 2 and 3 wherein a tool is supported by a compound tool rest of a lathe and moved to form a flange of a configuration such as that shown in FIG. 4. A plurality of such ends are prepared and joints generally in accordance with FIG. 4 are prepared for test evaluation, with the exception that the vent tube 48 of FIG. 4 is omitted. Evaluation of the joints with water at 200°F. under a pressure of 30 pounds indicates that the joints are leak-free for a period of 100 days. Subsequent temperature cycling on a 24 hour schedule wherein the joints are cooled to about 55°F. and subsequently re-heated to 200°F. for a period of 25 cycles results in no leakage.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A method for forming ends of thermoplastic lined metallic conduit, the steps of the method comprising
    providing a ductile metal conduit having a thermoplastic resinous liner, the conduit having an end,
    affixing the lining to the conduit adjacent to the end by means of a ductile metal retainer, and simultaneously
    deforming the conduit and liner to form a generally radially outwardly extending flange.

2. The method of claim 1 wherein at least a portion of the flange has a frustoconical configuration and encircles a portion of the conduit.

3. The method of claim 1 including the step of disposing a ductile metal sleeve within the end of the conduit and simultaneously deforming the sleeve, 4. The method of claim 1 wherein the conduit end is deformed by means of a generally frustoconical tool.

* * * * *